US012774787B2

(12) United States Patent
Wang

(10) Patent No.: US 12,774,787 B2
(45) Date of Patent: Oct. 27, 2026

(54) GAS STORAGE RESERVOIR ASSEMBLY APPLIED TO CARBON DIOXIDE ENERGY STORAGE SYSTEM AND CARBON DIOXIDE ENERGY STORAGE SYSTEM

(71) Applicant: Exax Energy Technology (Shenzhen) Co., Ltd, Shenzhen (CN)

(72) Inventor: Qin Wang, Shenzhen (CN)

(73) Assignee: Exax Energy Technology (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 19/346,479

(22) Filed: Sep. 30, 2025

(65) Prior Publication Data

US 2026/0168624 A1 Jun. 18, 2026

(30) Foreign Application Priority Data

Dec. 13, 2024 (CN) ......................... 202411835200.9

(51) Int. Cl.
*F17C 9/00* (2006.01)

(52) U.S. Cl.
CPC ........ *F17C 9/00* (2013.01); *F17C 2205/0323* (2013.01); *F17C 2205/0352* (2013.01); *F17C 2221/013* (2013.01); *F17C 2265/06* (2013.01)

(58) Field of Classification Search
CPC ....... H02J 3/28; H02J 15/00; F17C 2221/013; F17C 2265/06; F17C 2265/068
See application file for complete search history.

(56) References Cited

U.S. PATENT DOCUMENTS 9,309,473 B2 * 4/2016 McAlister ................. C01B 3/24
10,612,512 B2 * 4/2020 Jiang ....................... F03B 13/06
2018/0180019 A1 * 6/2018 Jiang ....................... F03B 13/06

FOREIGN PATENT DOCUMENTS

CN 109335366 A * 2/2019 ............ B65D 90/04
CN 216556469 U * 5/2022
CN 222029700 U * 11/2024

* cited by examiner

*Primary Examiner* — Thomas E Lazo

(57) ABSTRACT

A gas storage reservoir assembly applied to a carbon dioxide energy storage system includes a gas storage reservoir, gas distribution pipes, and a connecting pipe. The carbon dioxide energy storage system further includes an energy storage assembly, an energy storage container, and an energy release assembly. Each of the gas distribution pipes defines multiple gas ports connected to a gas storage space of the gas storage reservoir. A first end of the connecting pipe is connected to the gas distribution pipes, and a second end thereof is connected to at least one of the energy storage assembly and the energy release assembly directly or through a pipeline structure. A distance between a connection position of each of the gas distribution pipes and the connecting pipe, and an end of the gas distribution pipe is 40% to 60% of a length of the gas distribution pipe.

18 Claims, 8 Drawing Sheets

GAS STORAGE RESERVOIR ASSEMBLY APPLIED TO CARBON DIOXIDE ENERGY STORAGE SYSTEM AND CARBON DIOXIDE ENERGY STORAGE SYSTEM

CROSS-REFERENCE TO RELATED APPLICATION

This application claims priority to Chinese Patent Application No. 202411835200.9, filed on Dec. 13, 2024, which is herein incorporated by reference in its entirety.

TECHNICAL FIELD

The disclosure relates to the field of carbon dioxide energy storage technologies, and more particularly to a gas storage reservoir assembly applied to a carbon dioxide energy storage system and the carbon dioxide energy storage system.

BACKGROUND

In a carbon dioxide energy storage system, a gas storage reservoir is required to supply carbon dioxide gas to an energy storage assembly of the carbon dioxide energy storage system or to receive carbon dioxide gas delivered from an energy release assembly. Pipeline arrangement between the gas storage reservoir and the energy storage assembly, or between the gas storage reservoir and the energy release assembly, significantly impacts the energy storage efficiency and safe operation of the carbon dioxide energy storage system. Currently, no information has been retrieved regarding the pipeline arrangement between the gas storage reservoir and the energy storage assembly or between the gas storage reservoir and the energy release assembly in the carbon dioxide energy storage system.

It should be noted that information disclosed in the foregoing "Background" section is intended solely to enhance the understanding of the background of the disclosure and may include information that does not constitute related art known to those skilled in the art.

SUMMARY

A purpose of the disclosure is to overcome shortcomings of the related art described above by providing a gas storage reservoir assembly applied to a carbon dioxide energy storage system and the carbon dioxide energy storage system, which achieves more balanced gas intake flow or gas exhaust flow in different regions of a gas storage space of a gas storage reservoir, thereby reducing engineering design difficulty and commissioning complexity of the gas storage reservoir assembly and lowering operating costs.

In an aspect of the disclosure, a gas storage reservoir assembly applied to a carbon dioxide energy storage system is provided. The carbon dioxide energy storage system includes an energy storage assembly, an energy storage container, and an energy release assembly sequentially connected in that order. The gas storage reservoir assembly includes a gas storage reservoir, gas distribution pipes, and a connecting pipe. Each of the gas distribution pipes defines multiple gas ports connected to a gas storage space of the gas storage reservoir. A first end of the connecting pipe is connected to the gas distribution pipes, and a second end of the connecting pipe is connected to at least one of the energy storage assembly and the energy release assembly directly or through a pipeline structure. A distance between a connection position a of each of the gas distribution pipes and the connecting pipe, and an end of the gas distribution pipe is 40% to 60% of a length of the gas distribution pipe.

In an embodiment of the disclosure, an extension direction of each of the gas distribution pipes is parallel to a length direction of the gas storage reservoir to reduce a number of connection positions between the gas distribution pipes and the connecting pipe.

In an embodiment of the disclosure, a number of the gas distribution pipes is multiple; and a long edge of the gas storage reservoir, the gas distribution pipes, and another long edge of the gas storage reservoir are sequentially arranged side by side at equal intervals in that order.

In an embodiment of the disclosure, in each of the gas distribution pipes, at least two adjacent gas ports of the multiple gas ports have different opening sizes to regulate gas intake flow or gas exhaust flow of the at least two adjacent gas ports.

In an embodiment of the disclosure, the number of the gas distribution pipes is multiple. The connecting pipe includes a first connecting pipe and a second connecting pipe. The first connecting pipe is connected to the gas distribution pipes. An end of the second connecting pipe is connected to the first connecting pipe, and another end of the second connecting pipe extends outside a boundary of the gas storage reservoir.

In an embodiment of the disclosure, an extension direction of the first connecting pipe is perpendicular to the extension direction of each of the gas distribution pipes. The end of the second connecting pipe is connected to an end of the first connecting pipe, and an extension direction of the second connecting pipe is parallel to the extension direction of the first connecting pipe. Alternatively, a distance between a connection position b of the first connecting pipe and the second connecting pipe, and an end of the first connecting pipe is 40% to 60% of a length of the first connecting pipe, and the extension direction of the second connecting pipe is perpendicular to the extension direction of the first connecting pipe.

In an embodiment of the disclosure, the gas distribution pipes and the connecting pipe are disposed below the gas storage reservoir, and the multiple gas ports penetrate through a base membrane of the gas storage reservoir and extend into the gas storage space.

In an embodiment of the disclosure, the number of the gas distribution pipes is multiple. The gas storage reservoir assembly further includes balance pipes, and each of the balance pipes is connected to the gas distribution pipes.

In an embodiment of the disclosure, the connecting pipe is provided with a shut-off valve, a flow control mechanism, and an exhaust mechanism disposed between the shut-off valve and the first end of the connecting pipe. The shut-off valve is configured to control closing or opening of the gas storage reservoir assembly, the flow control mechanism is configured to control gas intake flow or gas exhaust flow of the gas storage reservoir assembly, and the exhaust mechanism is configured to control exhaust or closure of the gas storage reservoir assembly.

In another aspect of the disclosure, a carbon dioxide energy storage system is provided, including the gas storage reservoir assembly described above.

The disclosure improves the balance of gas intake flow or gas exhaust flow in the different regions of the gas storage space of the gas storage reservoir by providing the gas distribution pipes in the gas storage reservoir and the connecting pipe connected to a position near a middle of each of the gas distribution pipes. This design reduces the engineering design difficulty and the commissioning complexity of the gas storage reservoir assembly and lowers the operating costs.

It should be understood that the foregoing general description and the following detailed description are merely exemplary and explanatory and do not limit the disclosure.

BRIEF DESCRIPTION OF DRAWINGS

Attached drawings, which are incorporated into and constitute a part of the specification, illustrate embodiments in accordance with the disclosure and, together with the specification, serve to explain principles of the disclosure. It is evident that the attached drawings described below are merely some embodiments of the disclosure, and for those skilled in the art, other attached drawings can be obtained based on these attached drawings without the need for inventive work.

DESCRIPTION OF REFERENCE SIGNS

SYS—carbon dioxide energy storage system; 100—gas storage subsystem; 110—gas storage reservoir assembly; 111—gas storage reservoir; 111*a*—gas storage space; 112—gas distribution pipe; 113—connecting pipe; 113*a*—second end of the connecting pipe; 1131—first connecting pipe; 1132—second connecting pipe; 114—exhaust mechanism; 115—flow control mechanism; 116—shut-off valve; 117—gas port; 118—balance pipe; 119—base membrane; 120—pipeline structure; 200—energy storage assembly; 201—compression energy storage part; 21—compressor; 22—energy storage heat exchanger; 23—condenser; 300—energy storage container; 400—energy release assembly; 401—expansion energy release part; 41—turbine; 42—energy release heat exchanger; 43—evaporator.

DETAILED DESCRIPTION OF EMBODIMENTS

Exemplary embodiments will now be described more fully with reference to attached drawings. However, the exemplary embodiments can be implemented in various forms and should not be construed as being limited to embodiments set forth herein. Instead, these embodiments are provided so that the disclosure will be thorough and complete and will fully convey the concept of the exemplary embodiments to those skilled in the art. Like reference signs refer to like elements throughout, and thus their description will be omitted. Furthermore, the attached drawings provided herein are schematic and not necessarily drawn to scale.

Although relative terms, such as "upper" and "lower", are used in the specification to describe relative relationship between one component and another component in the attached drawings, these terms are used herein merely for convenience, for example, based on orientations of components as shown in the attached drawings. It should be understood that if a device in the attached drawings is turned upside down, a component described as being "upper" will then be oriented "lower". When a component is referred to as being "on" another component, it can be directly on the other component or indirectly on the other component through an intervening component.

Terms "a", "one", "the", "said", and "at least one" are used to denote presence of one or more elements/components; terms "include" and "have" are used to indicate an open-ended inclusion, meaning that in addition to listed elements/components, there may also be other elements/components; terms such as "first" and "second" are used merely as labels and do not limit the quantity of objects they refer to.

Figure 1:
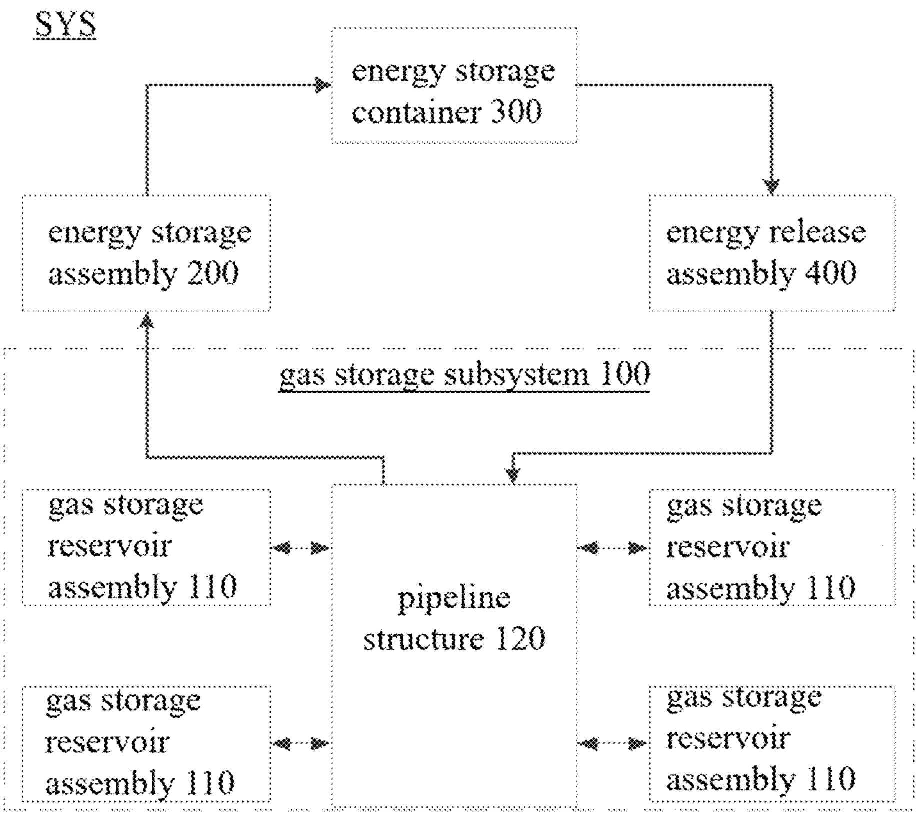
FIG. 1 illustrates a schematic diagram of a principle of a carbon dioxide energy storage system according to an embodiment of the disclosure.

The embodiments of the disclosure provide a carbon dioxide energy storage system SYS. As shown in FIG. 1, the carbon dioxide energy storage system SYS includes a gas storage subsystem 100, an energy storage assembly 200, an energy storage container 300, and an energy release assembly 400. Specifically, the gas storage subsystem 100 is connected to an inlet of the energy storage assembly 200, an outlet of the energy storage assembly 200 is connected to an inlet of the energy storage container 300, an outlet of the energy storage container 300 is connected to an inlet of the energy release assembly 400, and an outlet of the energy release assembly 400 is connected to the gas energy subsystem 100. The gas energy subsystem 100 can store gaseous carbon dioxide. The energy storage container 300 can store liquid carbon dioxide. The energy storage assembly 200 can compress the gaseous carbon dioxide from the gas storage subsystem 100 by using electricity, to achieve energy storage. The energy release assembly 400 can generate electricity by expanding the carbon dioxide from the energy storage container 300. The energy storage assembly

200 can also cool the compressed gaseous carbon dioxide, for example, cool the compressed gaseous carbon dioxide to condense into liquid carbon dioxide, or make the cooled gaseous carbon dioxide enter the energy storage container 300 to be condensed into the liquid carbon dioxide. The energy release assembly 400 can also heat the carbon dioxide, for example, evaporate the liquid carbon dioxide provided from the energy storage container 300 into gaseous carbon dioxide and heat it up, causing the heated gaseous carbon dioxide to expand and generate electricity, or heat the gaseous carbon dioxide pre-evaporated in the energy release assembly 400 to make the heated gaseous carbon dioxide to expand and generate electricity.

For example, in an energy storage stage, the energy storage assembly 200 can compress and condense the gaseous carbon dioxide from the gas storage subsystem 100, so that the gaseous carbon dioxide transforms into liquid carbon dioxide and is stored in the energy storage container 300. In an energy release stage, the energy release assembly 400 can evaporate the liquid carbon dioxide from the energy storage container 300 and generate electricity by expanding, so that the generated gaseous carbon dioxide is stored in the gas storage subsystem 100.

Figure 2:
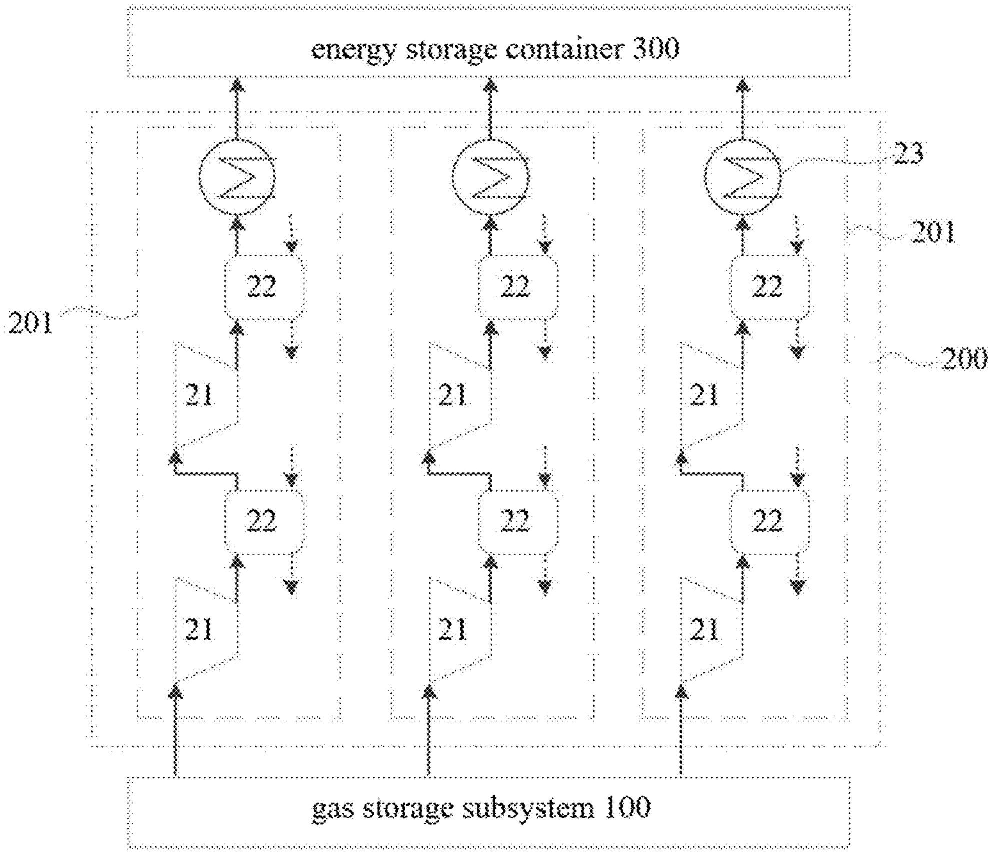
FIG. 2 illustrates a schematic structural diagram of an energy storage assembly according to an embodiment of the disclosure.

In an embodiment of the disclosure, as shown in FIG. 2, the energy storage assembly 200 includes at least one compression energy storage part 201. The compression energy storage part 201 includes a compressor 21 and an energy storage heat exchanger 22, and each compression energy storage part 201 is connected to the gas storage subsystem 100 and the energy storage container 300. Specifically, an inlet of each compression energy storage part 201 is connected to the gas storage subsystem 100, and an outlet of each compression energy storage part 201 is connected to the energy storage container 300. The compressor 21 can compress the gaseous carbon dioxide from the gas storage subsystem 100 under electric drive, and the compressed carbon dioxide can be heat exchanged and cooled in the energy storage heat exchanger 22.

In an example of FIG. 2, the energy storage assembly 200 includes three compression energy storage parts 201. It should be understood that, in other embodiments of the disclosure, a number of the compression energy storage parts 201 in the energy storage assembly 200 is not limited to three, for example, it can be 1 or multiple other quantities parts (such as 2, 4, 5, or 6).

In an embodiment of the disclosure, each compression energy storage part 201 includes a compression energy storage unit or multiple compression energy storage units sequentially cascaded. The compression energy storage unit can include a compressor 21 and an energy storage heat exchanger 22. An outlet of the compressor 21 is connected to a carbon dioxide inlet of the energy storage heat exchanger 22. In this way, after the gaseous carbon dioxide is compressed in the compressor 21, it flows into the energy storage heat exchanger 22 for heat exchange and cooling. When each compression energy storage part 201 includes multiple compression energy storage units sequentially cascaded, between two adjacent compression energy storage units, a carbon dioxide outlet of the energy storage heat exchanger 22 of a previous compression energy storage unit is connected to an inlet of the compressor 21 of a next compression energy storage unit. In the example of FIG. 2, each compression energy storage part 201 includes two compression energy storage units. It can be understood that the compression energy storage unit in the compression energy storage part 201 can be one, two, or more than two according to needs.

In the example of FIG. 2, a flow direction of the carbon dioxide in each compression energy storage part 201 is illustrated by solid arrows, and a flow direction of a cooling medium flowing through the energy storage heat exchanger 22 is illustrated by dashed arrows. In the energy storage heat exchanger 22, the compressed carbon dioxide with a higher temperature exchanges heat with the cooling medium with a lower temperature, which cools the carbon dioxide and facilitates its condensation into liquid carbon dioxide. The cooling medium absorbs heat and heats up to recover the heat generated during the compression process of carbon dioxide.

In an embodiment of the disclosure, an inlet of a first-stage compressor 21 of the compression energy storage part 201 is connected to the gas storage subsystem 100. It can be understood that when each compression energy storage part 201 has only one compression energy storage unit, the inlet of the compressor 21 of the compression energy storage part 201 is connected to the gas storage subsystem 100. Furthermore, a valve may be disposed between the inlet of the first-stage compressor 21 and the gas storage subsystem 100.

In an embodiment of the disclosure, the compression energy storage part 201 may further include a condenser 23, which is disposed between a last-stage compression energy storage unit and the energy storage container 300. In other words, a carbon dioxide outlet of a last-stage energy storage heat exchanger 22 may be connected to a carbon dioxide inlet of the condenser 23, and a carbon dioxide outlet of the condenser 23 may be connected to the inlet of the energy storage container 300. The condenser 23 may condense the carbon dioxide from the compression energy storage unit, so that the carbon dioxide from the compression energy storage unit is condensed into liquid carbon dioxide and stored in the energy storage container 300.

Figure 3:
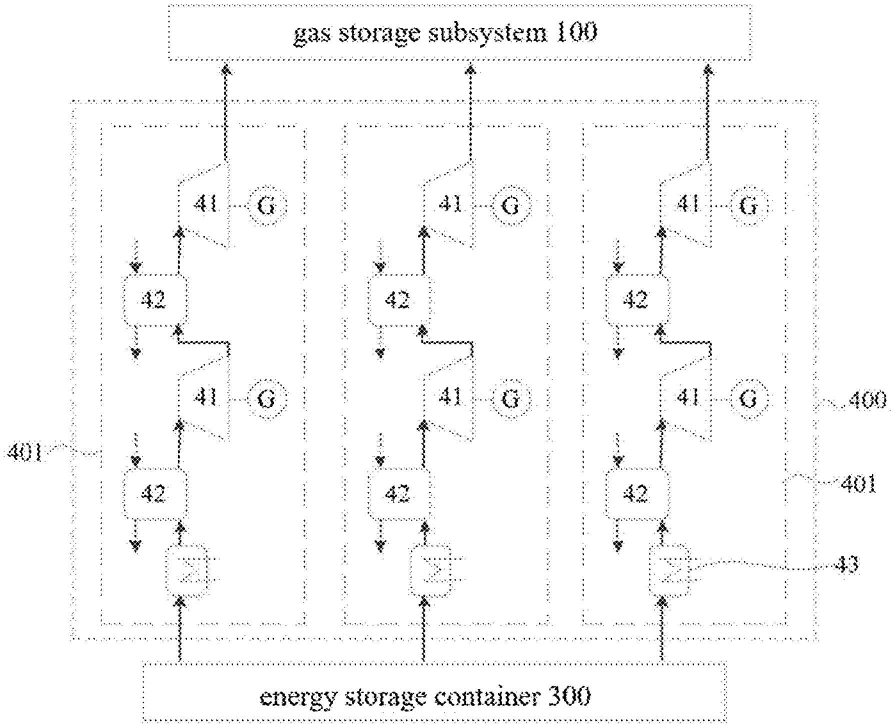
FIG. 3 illustrates a schematic structural diagram of an energy release assembly according to an embodiment of the disclosure.

In an embodiment of the disclosure, as shown in FIG. 3, the energy release assembly 400 includes at least one expansion energy release part 401. The expansion energy release part 401 includes a turbine 41 and an energy release heat exchanger 42, and each expansion energy release part 401 is connected to the gas storage subsystem 100 and the energy storage container 300. Specifically, an inlet of each expansion energy release part 401 is connected to the energy storage container 300, and an outlet of each expansion energy release part 401 is connected to the gas storage subsystem 100. The carbon dioxide from the energy storage container 300 can enter the turbine 41 after absorbing heat in the energy release heat exchanger 42, thereby driving a generator G to generate electricity.

In an embodiment of FIG. 3, the energy storage assembly 400 includes three expansion energy release parts 401. It can be understood that in other embodiments of the disclosure, a number of the expansion energy release parts 401 in the energy release assembly 400 is not limited to 3, for example, it can be 1, or other numbers (such as 2, 4, 5 or 6).

In an embodiment of the disclosure, the expansion energy release part 401 includes one expansion energy release unit or multiple expansion energy release units cascaded in sequence. The expansion energy release unit may include a turbine 41 and an energy release heat exchanger 42. A carbon dioxide outlet of the energy release heat exchanger 42 is connected to an inlet of the turbine 41. In this way, after the carbon dioxide absorbs heat in the energy release heat exchanger 42, it flows into the turbine 41 to expand and generate electricity. When the expansion energy release part 401 includes multiple expansion energy release units cascaded in sequence, between two adjacent expansion energy release units, an outlet of a turbine 41 of a previous-stage compression energy storage unit is connected to a carbon dioxide inlet of the energy release heat exchanger 42 of a next-stage expansion energy release unit. In the example of FIG. 3, the expansion energy release part 401 includes two expansion energy release units. It can be understood that the expansion energy release unit in the expansion energy release part 401 can be one, or it can be two or more than two according to needs.

In the example of FIG. 3, a flow direction of the carbon dioxide in the expansion energy release part 401 is illustrated by solid arrows, and a flow direction of a heating medium flowing through the energy release heat exchangers 42 is illustrated by dashed arrows. In the energy release heat exchanger 42, the carbon dioxide that flows out of the energy storage container 300 and expands and cools down, exchanges heat with the heating medium with a higher temperature, thereby heating the carbon dioxide, which can recover the cold energy generated by the expansion of the gaseous carbon dioxide.

In an embodiment of the disclosure, an outlet of a last-stage turbine 41 of the expansion energy release part 401 is connected to the gas storage subsystem 100. It can be understood that when the expansion energy release part 401 has only one expansion energy release unit, the outlet of the turbine 41 of the expansion energy release part 401 is connected to the gas storage subsystem 100. Optionally, a valve is disposed between the outlet of the last-stage turbine 41 of the expansion energy release part 401 and the gas storage subsystem 100.

In an embodiment of the disclosure, the expansion energy release part 401 may further include an evaporator 43, which is disposed between a first-stage expansion energy release unit and the energy storage container 300. In other words, a carbon dioxide inlet of a first-stage power generation heat exchanger 42 may be connected to a carbon dioxide outlet of the evaporator 43, and a carbon dioxide inlet of the evaporator 43 may be connected to the outlet of the energy storage container 300. The evaporator 43 may heat the liquid carbon dioxide from the energy storage container 300, so that the liquid carbon dioxide from the energy storage container 300 is evaporated into gaseous carbon dioxide and flows into the energy release heat exchanger 42.

It can be understood that in other embodiment of the disclosure, the carbon dioxide energy storage system SYS may also be provided with other components. In an embodiment, the carbon dioxide energy storage system SYS may also be provided with a heat recovery assembly, which includes a heat storage tank and a cold storage tank. In the energy storage phase, the energy storage heat exchanger 22 may exchange heat with the low-temperature medium (i.e., the cooling medium flowing into the energy storage heat exchanger 22) from the cold storage tank, so that the carbon dioxide in the energy storage heat exchanger 22 is cooled down, and the low-temperature medium is heated to a high-temperature medium and stored in the heat storage tank. In the energy release phase, the energy release heat exchanger 42 may exchange heat with the high-temperature medium (i.e., the heating medium flowing into the energy release heat exchanger 42) from the heat storage tank, so that the carbon dioxide in the energy release heat exchanger 42 is heated up, and the high-temperature medium is cooled to the low-temperature medium and stored in the cold storage tank. In the embodiment, the heating medium and the cooling medium are heat exchange media circulating between the heat storage tank and the cold storage tank, and the temperature states are different.

In the examples of FIGS. 1 to 3, a number of the energy storage containers 300 is one. It can be understood that in embodiments of the disclosure, the number of the energy storage containers 300 may also be multiple. When the number of the energy storage containers 300 is multiple, these energy storage containers 300 may be connected in series, or in parallel, or may be connected in a mixed manner of series and parallel.

Figure 14:
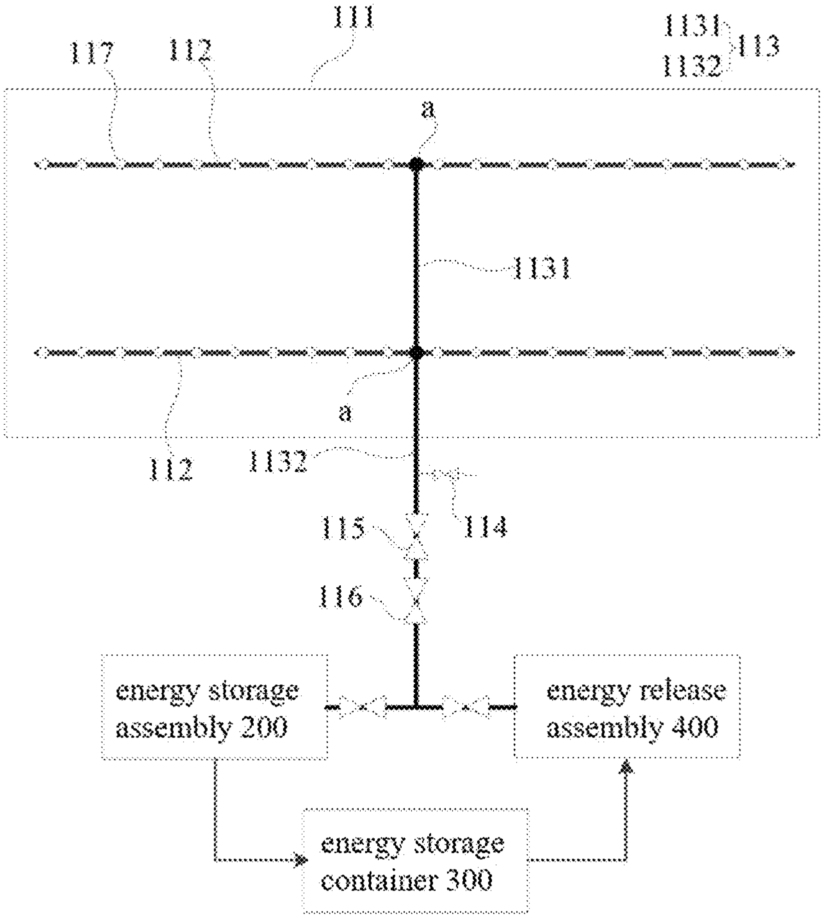
FIG. 14 illustrates a schematic structural diagram of the carbon dioxide energy storage system according to an embodiment of the disclosure.

In an embodiment of the disclosure, as shown FIG. 1, the gas storage subsystem 100 includes a pipeline structure 120 and at least one gas storage reservoir assembly 110 connected to the pipeline structure 120. Specifically, the pipeline structure 120 is connected to at least one of the energy storage assembly 200 and the energy release assembly 400. For example, in the example of FIG. 1, the pipeline structure 120 is simultaneously connected to the inlet of the energy storage assembly 200 and the outlet of the energy release assembly 400. In this way, during the energy storage stage, the gaseous carbon dioxide stored in the gas storage reservoir assemblies 110 can flow into the energy storage assembly 200 through the pipeline structure 120. During the energy release stage, the gaseous carbon dioxide flowing out of the energy storage container 300 can flow into the gas storage reservoir assemblies 110 through the pipeline structure 120. It can be understood that in other embodiments of the disclosure, the gas storage subsystem 100 may not be provided with the piping structure 120, and instead the gas storage reservoir assembly 110 may be directly connected to both the energy storage assembly 200 and the energy release assembly 400. For example, in an example of FIG. 14, the gas storage subsystem 100 includes only one gas storage reservoir assembly 110, which can be directly connected to both the energy storage assembly 200 and the energy release assembly 400. Valves are disposed between the gas storage reservoir assembly 110 and the energy storage assembly 200, and between the gas storage assembly reservoir 110 and the energy release assembly 400, respectively.

In the embodiment of FIG. 1, the gas storage subsystem 100 includes multiple gas storage reservoir assemblies 110. It can be understood that in other embodiments of the disclosure, a number of the gas storage reservoir assemblies 110 in the gas storage subsystem 100 may also be one.

In the embodiment of FIG. 1, the multiple gas storage reservoir assemblies 110 are connected to the pipeline structure. Therefore, when the multiple gas storage reservoir assemblies 110 provides gaseous carbon dioxide to the energy storage assembly 200, the pipeline structure 120 can rebalance the gas flow rate and gas pressure, which is conducive to maintaining a stable gas flow output of the gas storage subsystem 100 on the one hand, and on the other hand, it is conducive to balancing the gas flow rate of each gas storage reservoir assembly 110, so that the gas flow rate of each gas storage reservoir assembly 110 is generally consistent. This helps to improve the overall efficiency of the carbon dioxide energy storage system SYS. Similarly, when the energy release assembly 400 provides gaseous carbon dioxide to the multiple gas storage reservoir assemblies 110, the pipeline structure 120 can rebalance the gas flow rate and gas pressure, which is conducive to balancing the intake flow of each gas storage reservoir assembly 110, so that the intake flow of each gas storage reservoir assembly 110 is generally consistent.

In some embodiments of the disclosure, as shown in FIGS. 4-13, each gas storage reservoir assembly 110 includes a gas storage reservoir 111, a gas distribution pipe 112, and a connecting pipe 113. The gas distribution pipe 112 defines multiple gas ports 117 connected to a gas storage space 111*a* of the gas storage reservoir 111. A first end of the connecting pipe 113 is connected to the gas distribution pipe 112, and a second end 113*a* of the connecting pipe 113 is connected to at least one of the energy storage assembly and the energy release assembly directly or through a pipeline structure. Specifically, the second end 113*a* of the connecting pipe 113 is located outside a boundary of the gas storage reservoir 111.

For example, in an embodiment, the second end 113*a* of the connecting pipe 113 is connected to the pipeline structure 120, and the pipeline structure 120 is connected to the energy storage assembly 200 and the energy release assembly 400.

For example, in another embodiment, the second end 113*a* of the connecting pipe 113 is directly connected to the energy storage assembly 200 and the energy release assembly 400.

In these embodiments, the gas distribution pipe 112 defines multiple gas ports 117 connected to the gas storage space 111*a* of the gas storage reservoir 111. In the energy storage stage, the gaseous carbon dioxide in the gas storage space 111*a* of the gas storage reservoir 111 can enter the distribution pipe 112 through the multiple gas ports 117, and then flow out of the boundary of the gas storage reservoir 111 through the distribution pipe 112 and the connecting pipe 113, and into the energy storage assembly 200. In the energy release stage, the gaseous carbon dioxide provided by the energy release assembly 400 to the connecting pipe 113 can enter the distribution pipe 112 and flow into the gas storage space 111*a* of the gas storage reservoir 111 through the multiple gas ports 117. A connection position a between the gas distribution pipe 112 and the connecting pipe 113 is disposed close to a middle of the gas distribution pipe 112, so that a gas resistance of a part of the gas distribution pipe 112 on a side of the connection position a is substantially consistent with a gas resistance of a part of the gas distribution pipe 112 on another side thereof. In the energy storage stage, this configuration allows gas inflow rates of the gas ports 117 to be substantially uniform, thereby promoting a more uniform settling speed of an inner membrane of the gas storage reservoir 111 and avoiding excessive differential settling degrees of the inner membrane at different positions. In the energy release stage, this configuration facilitates gas outflow rates of the gas ports 117 to be substantially uniform, thereby promoting a more uniform lifting speed of the inner membrane of the gas storage reservoir 111 and avoiding excessive differential lifting degrees of the inner membrane at different positions.

In some embodiments of the disclosure, the gas distribution pipe 112 may be connected to the connecting pipe 113 using a tee fitting or a cross fitting.

In some embodiments of the disclosure, a distance between the connection position a of the gas distribution pipe 112 and the connecting pipe 113, and an end of the gas distribution pipe 112 is 45% to 50% of a length of the gas distribution pipe 112, especially 48% to 50%. In an embodiment, a distance between the connection position a of the gas distribution pipe 112 and the connecting pipe 113, and the end of the gas distribution pipe 112 is 50% of the length of the gas distribution pipe 112. In other words, a midpoint of the gas distribution pipe 112 is connected to the connecting pipe 113. This design ensures that air resistances of the gas distribution pipe 112 on both sides of the connection position a are as close as possible. This facilitates the engineering design and debugging of the gas storage reservoir assembly 110, reduces the complexity of operation of the gas storage reservoir assembly 110, and achieves a goal of reducing the design and operating costs of the gas storage reservoir assembly 110.

In an embodiment of the disclosure, as shown in FIGS. 4-12, the gas distribution pipe 112 can be disposed within the boundary of the gas storage reservoir 111. Specifically, a projection of the gas distribution pipe 112 on a horizontal plane is located within a projection of the gas storage reservoir 111 on the horizontal plane. This design ensures that the gas distribution pipe 112 can supply gas or draw gas into the storage space 111*a* of the gas storage reservoir 111 normally. At the same time, it avoids engineering costs associated with an unnecessary extension of the gas distribution pipe 112.

In an embodiment of the disclosure, as shown in FIG. 3, the gas distribution pipe 112 can be located below the gas storage reservoir 111, for example, buried beneath the gas storage reservoir 111. A lower end of each of the gas ports 117 is connected to the gas distribution pipe 112, and an upper end of each of the gas ports extends through a base membrane 119 of the gas storage reservoir 111 and into the gas storage space 111*a* of the gas storage reservoir 111. In an embodiment, each gas port 117 can be a vertical pipe, and a lower end of the vertical pipe is connected to the gas distribution pipe 112 and an upper end of the vertical pipe extends into the gas storage space 111*a*. On one hand, a main structure of the gas distribution pipe 112 and the gas ports 117 (i.e., a main part of the vertical pipes) is located below the gas storage reservoir 111, for example, buried below the base membrane 119 of the gas storage reservoir 111, which facilitates the securing and vibration reduction of the gas distribution pipe 112 and the gas ports 117. On the other hand, this design reduces the need for support and fixation of the gas distribution pipe 112 within the gas storage space 111*a* of the gas storage reservoir 111, which helps to improve the airtightness of the gas storage reservoir 111. Furthermore, a portion of the connecting pipe 113 within the boundary of the gas storage reservoir 111 can also be located below the gas storage reservoir 111, for example, located at a same horizontal level as the gas distribution pipe 112.

In an embodiment of the disclosure, as shown in FIGS. 4-9, an extension direction of the gas distribution pipe 112 is parallel to a length direction of the gas storage reservoir 111. Especially, when a length of the gas storage reservoir 111 is much greater than a width of the gas storage reservoir 111, for example, when the length of the gas storage reservoir 111 is more than twice its width, this design can reduce a number of gas distribution pipes 112 within the boundary of the gas storage reservoir 111. This, in turn, reduces a number of connection points between the gas distribution pipes 112 and the connecting pipe 113, which helps to reduce construction costs.

Figure 11:
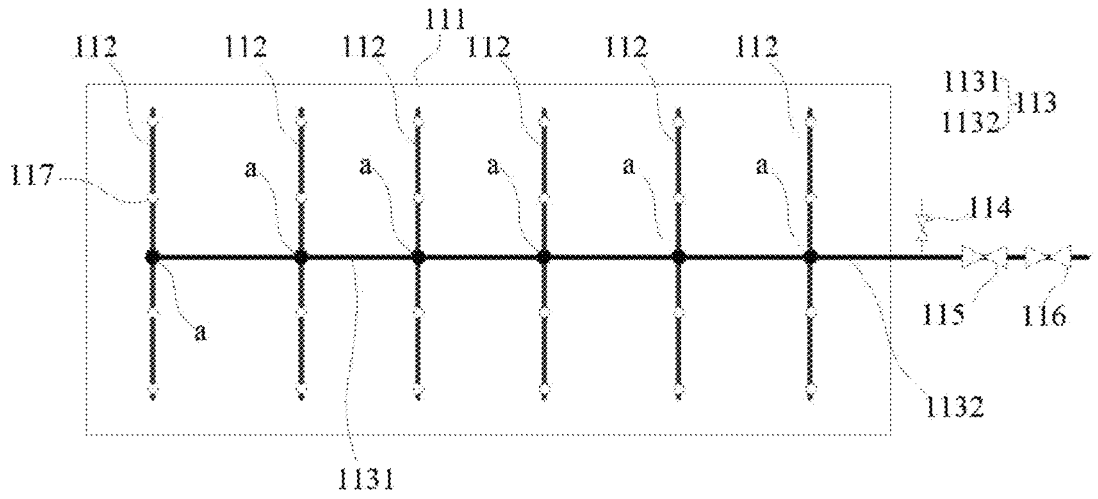
FIG. 11 illustrates an eighth schematic structural diagram of the gas storage reservoir assembly according to an embodiment of the disclosure.
Figure 12:
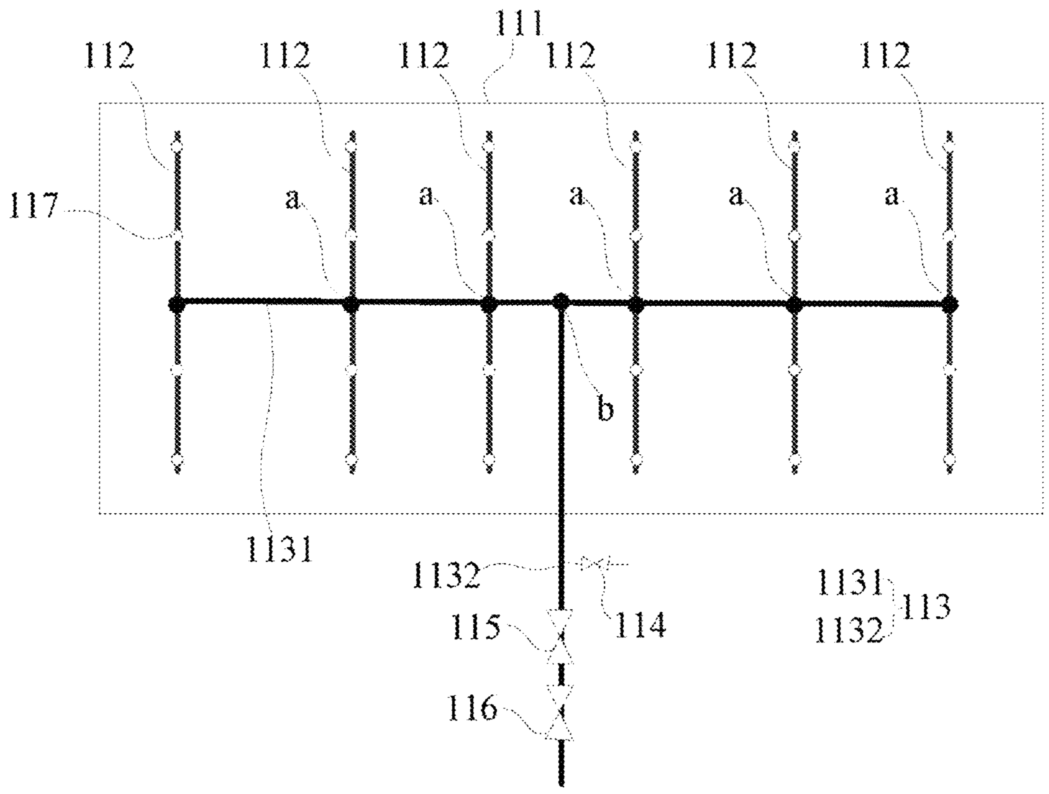
FIG. 12 illustrates a ninth schematic structural diagram of the gas storage reservoir assembly according to an embodiment of the disclosure.
Figure 13:
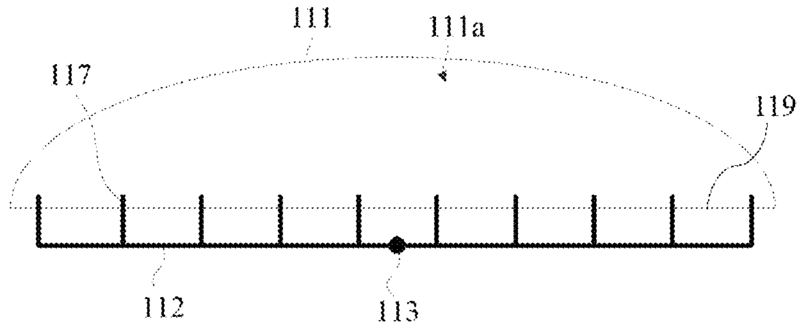
FIG. 13 illustrates a tenth schematic structural diagram of the gas storage reservoir assembly according to an embodiment of the disclosure.

In some other embodiments of the disclosure, the extension direction of each gas distribution pipe 112 may also not be parallel to the length direction of the gas storage reservoir 111. For example, in the gas storage reservoir assembly 110 as illustrated in FIG. 11 and FIG. 12, the extension direction of each gas distribution pipe 112 is perpendicular to the length direction of the gas storage reservoir 111.

In an embodiment of the disclosure, as shown in FIGS. 4-7 and FIGS. 9-12, the gas storage reservoir assembly 110 includes multiple gas distribution pipes 112, and the multiple gas distribution pipes 112 are arranged at equal intervals. Specifically, the gas distribution pipes 112 can be parallel to two opposite edges of the gas storage reservoir 111. An edge of the gas storage reservoir 111, the multiple gas distribution pipes 112, and another edge of the gas storage reservoir 111 are sequentially arranged side by side at equal intervals in that order. For example, in the embodiments of FIGS. 4-7, the extension direction of each gas distribution pipe 112 is parallel to a long edge of the gas storage reservoir 111, and the long edge of the gas storage reservoir 111, the multiple gas distribution pipes 112, and another long edge of the gas storage reservoir 111 are sequentially arranged side by side at equal intervals in that order. This arrangement of the gas distribution pipes 112 in the gas storage reservoir assembly 110 allows the gas distribution pipes 112 to be distributed as evenly as possible in the gas storage reservoir 111, thereby facilitating the uniformity of the gas flow for intake or exhaust at different locations in the gas storage reservoir 111.

Figure 9:
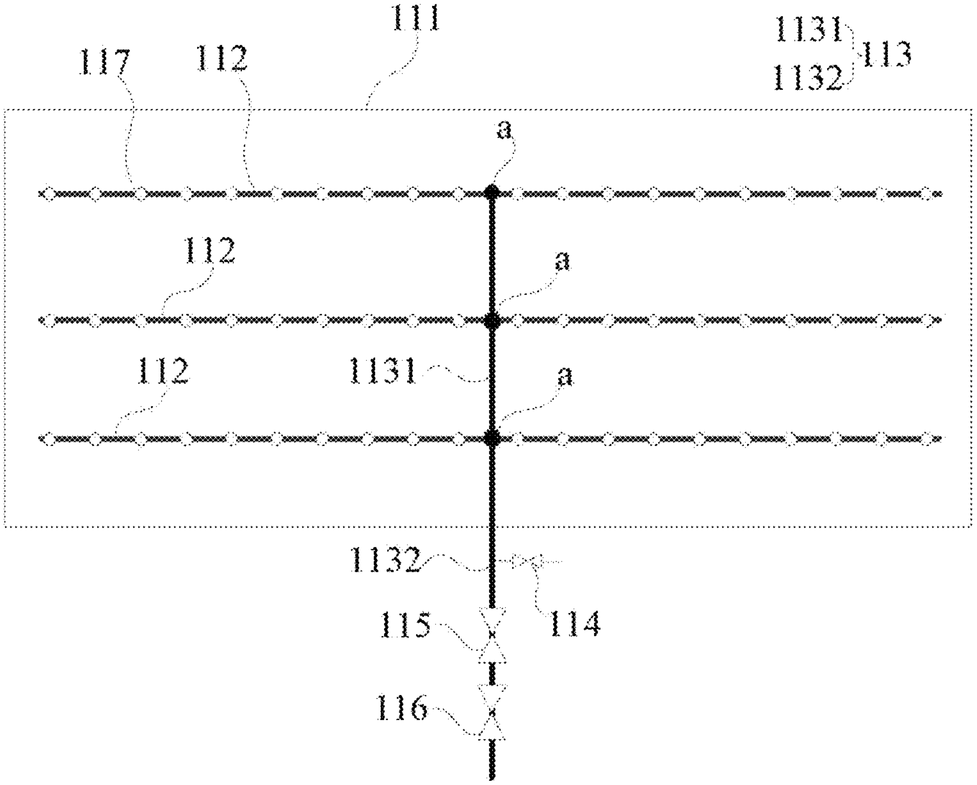
FIG. 9 illustrates a sixth schematic structural diagram of the gas storage reservoir assembly according to an embodiment of the disclosure.
Figure 10:
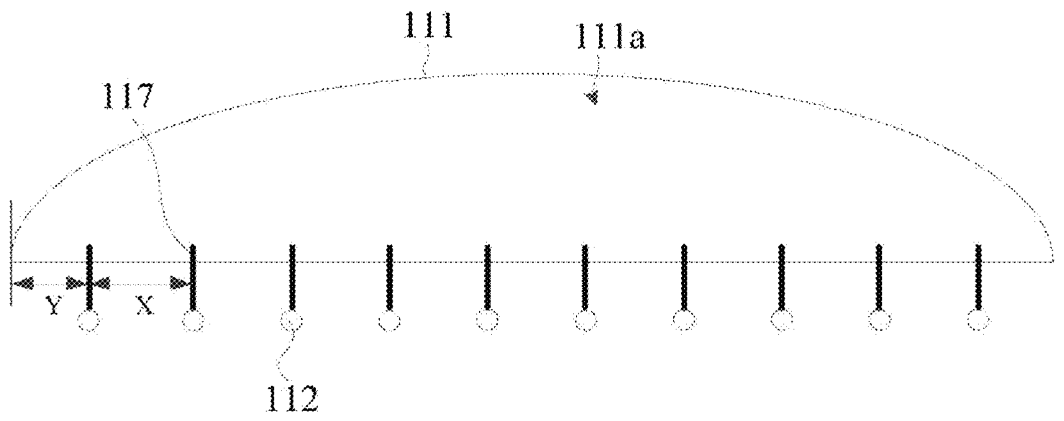
FIG. 10 illustrates a seven schematic structural diagram of the gas storage reservoir assembly according to an embodiment of the disclosure.

In some other embodiment of the disclosure, the gas distribution pipes 112 in the gas storage reservoir assembly 110 are arranged parallel to each other and arranged at equal intervals. The gas storage reservoir 111 has a characteristic edge parallel to the gas distribution pipes 112. For example, as shown in FIG. 9, the long edge of the gas storage reservoir 111 is the characteristic edge. In these embodiments, a component of a distance between the characteristic edge of the gas storage reservoir 111 and one of the gas distribution pipes 112 closest to the characteristic edge on the horizontal plane is less than a distance between every two adjacent gas distribution pipes 112 on the horizontal plane. In an embodiment, as shown in FIG. 10, the distance plane between every two adjacent gas distribution pipes 112 on the horizontal is X, and the component of the distance between the characteristic edge of the gas storage reservoir 111 and the one of the gas distribution pipes 112 closet to the characteristic edge on the horizontal plane is Y, satisfying $X/2<Y<X$. Specifically, the component of the distance between the characteristic edge of the gas storage reservoir 111 and the one of the gas distribution pipes 112 closest to the characteristic edge on the horizontal plane is 0.6 to 0.75 times the distance between every two adjacent gas distribution pipes 112 on the horizontal plane, for example, 0.66 times. Due to the influence of inner and outer membrane structures of the gas storage reservoir 111, when the gas storage space 111*a* of the gas storage reservoir is filled with gaseous carbon dioxide, a height of the gas storage space 111*a* close to each edge of the gas storage reservoir 111 is less than a height of the gas storage space 111*a* close to a middle portion of the gas storage reservoir 111. Therefore, close to the characteristic edge of the gas storage reservoir 111, a region affected by the intake or exhaust of a single gas port 117 can be larger on the horizontal plane, which is more conducive to keeping the inner membrane of the gas storage reservoir 111 in synchronous settling or lifting. In an embodiment, the characteristic edge of the gas storage reservoir 111 is the long edge of the gas storage reservoir 111.

In an embodiment of the disclosure, in the multiple gas ports 117 on each gas distribution pipe 112, at least two adjacent gas ports 113 have different opening sizes. On one hand, when a distance between one of the at least two adjacent gas ports 117 and the connection position a (connection position between the gas distribution pipe 112 and the connecting pipe 113) is greater, an air resistance between the gas port 117 and the connection position a is larger. Therefore, by adjusting opening sizes of the gas ports 117, the gas intake flow rate or gas exhaust flow rate of each gas port 117 can be regulated, thereby making the gas intake flow rates or gas exhaust flow rates of the gas ports 117 roughly consistent. For example, when a gas port 117 is farther from the connection position a, an opening size of the gas port 117 can be larger.

In other embodiments of the disclosure, opening sizes of the gas ports 117 on each gas distribution pipe 112 connected to the distribution pipe 112 can be uniform, and a distance between two adjacent gas ports 117 can be adjusted as needed. For example, a spacing of the gas ports 117 gradually decreases along a direction from the connection position a towards the end of the distribution pipe 112. In other words, the farther the average distance between the two adjacent gas ports 117 and the connection position a, the smaller the spacing between these adjacent gas ports 117. In this way, the gas distribution pipe 112 can compensate for the increased air resistance at the end of the gas distribution pipe 112 by increasing a number of the gas ports 117, thereby maintaining a substantially balanced total gas inflow or outflow in the different regions of the storage space 111*a* of the storage reservoir 111.

In an embodiment of the disclosure, as shown in FIGS. 4-12, the storage reservoir assembly 110 includes the connecting pipe 113, an end of the connecting pipe 113 is connected to the distribution pipe 112, and another end of the connecting pipe 113 extends outside the boundary of the gas storage reservoir 111 to connect to the pipeline structure 120, the energy storage assembly 200, or the energy release assembly 400. Optionally, a part of the connecting pipe 113 that connects to the distribution pipe 112 extends in a direction perpendicular to the extension direction of the distribution pipe 112. This configuration, without altering the basic shape of the connecting pipe 113, can reduce a length of the connecting pipe 113 to lower the cost of the gas storage reservoir assembly 110. Particularly, when the gas storage reservoir assembly 110 includes multiple gas distribution pipes 112, the connecting pipe 113 can minimize a length of a part interconnecting the gas distribution pipe 112.

Optionally, in the gas storage reservoir assembly 110, the number of the gas distribution pipes 112 is multiple. The connecting pipe 113 includes a first connecting pipe 1131 and a second connecting pipe 1132. The first connecting pipe 1131 is connected to the gas distribution pipes 112. An end of the second connecting pipe 1132 is connected to the first connecting pipe 1131, and another end of the second connecting pipe 1132 extends outside the boundary of the storage reservoir 111.

In an embodiment of the disclosure, the extension direction of the first connecting pipe 113 is perpendicular to the extension direction of each gas distribution pipe 112. A distance between a connection position b of the first connecting pipe 1131 and the second connecting pipe 1132, and an end of the first connecting pipe 1131 is 40% to 60% of a length of the first connecting pipe 1131, and an extension direction of the second connecting pipe 1132 is perpendicular to the extension direction of the first connecting pipe 1131.

Figure 4:
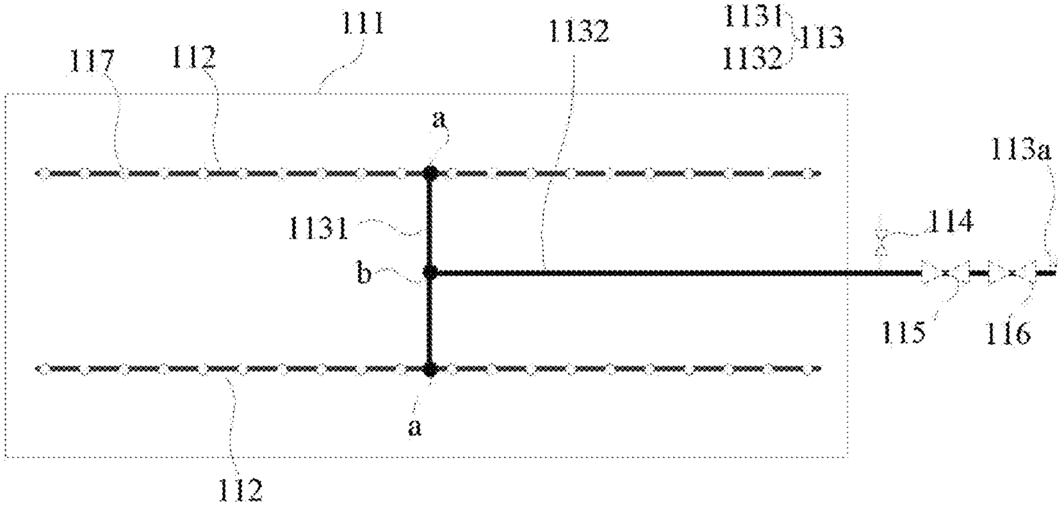
FIG. 4 illustrates a first schematic structural diagram of a gas storage reservoir assembly according to an embodiment of the disclosure.

For example, in the gas storage reservoir assembly 110 illustrated in FIG. 4, the number of the gas distribution pipes 112 is two, and the extension direction of each of the two gas distribution pipes 112 is parallel to the length direction of the gas energy reservoir 111. The connecting pipe 113 includes the first connecting pipe 1131 and the second connecting pipe 1132. Both ends of the first connecting pipe 1131 are connected to the two gas distribution pipes 112, respectively, and the extension direction of the first connection pipe 1131 is perpendicular to the extension direction of each of the two gas distribution pipes 112. The end of the second connecting pipe 1132 is connected to a middle portion of the first connecting pipe 1131 (a connection position between the second connecting pipe 1132 and the first connecting pipe 1131 is marked as b in FIG. 4), and the second connecting pipe 1132 extends outside the boundary of the gas reservoir 111. For example, the second connecting pipe 1132 extends in a direction linearly parallel to the extension direction of each of the two gas distribution pipes 112 to outside the boundary of the gas reservoir 111. Further, a distance between the connection position b and the end of the first connecting pipe 1131 is half the length of the first connecting pipe 1131. Thus, the second connecting pipe 1132 can uniformly charge gas to or draw gas from the two gas distribution pipes 112 through the first connecting pipe 1131.

In the gas storage reservoir assembly 110 illustrated in FIG. 4, the second connecting pipe 1132 extends outside the boundary of the gas storage reservoir 111 from a short edge of the gas storage reservoir 111. For example, the second connecting pipe 1132 is at an equal distance from two long edges of the gas storage reservoir 111. It can be understood that the configuration of the second connecting pipe 1132 in the embodiments of the disclosure is not limited to this configuration.

In another embodiment of the disclosure, the extension direction of the first connecting pipe 1131 is perpendicular to the extension direction of each gas distribution pipe 112. The end of the second connecting pipe 1132 is connected to the end of the first connecting pipe 1131, and an extension direction of a part or all of the second connecting pipe 1132 is parallel to the extension direction of the first connecting pipe 1131.

Figure 5:
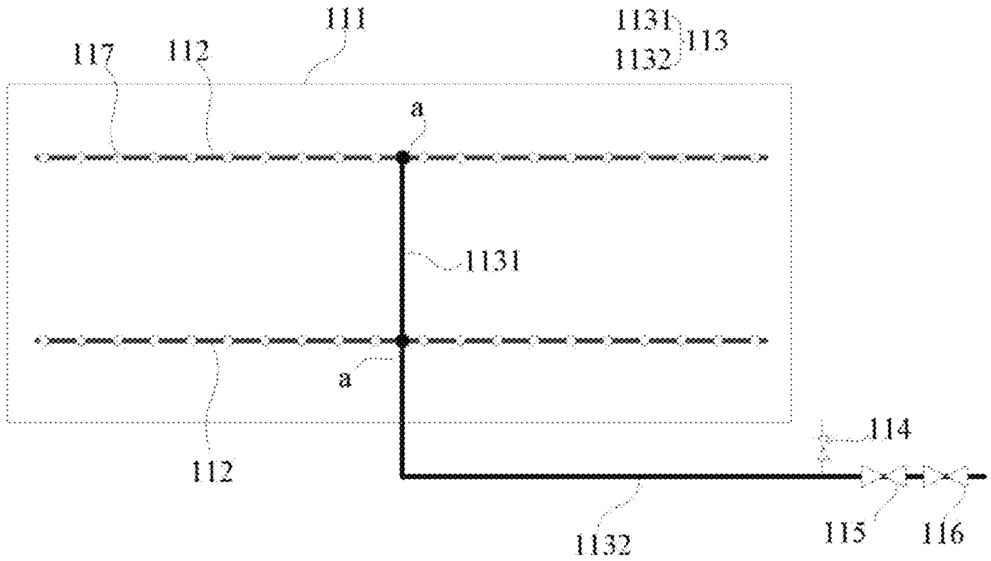
FIG. 5 illustrates a second schematic structural diagram of the gas storage reservoir assembly according to an embodiment of the disclosure.

For example, in the gas storage reservoir assembly 110 illustrated in FIG. 5, the second connecting pipe 1132 can extend outside the boundary of the gas storage reservoir 111 in the direction parallel to the first connecting pipe 1131, and then bend to a suitable position. For instance, the extension direction of each gas distribution pipe 112 is parallel to the length direction of the gas storage reservoir 111, while the first connecting pipe 1131 extends in the direction perpendicular to the gas distribution pipes 112 and connects to the gas distribution pipes 112. The first end of the second connecting pipe 1132 is connected to the end of the first connecting pipe 1131, then extends outside the boundary of the gas storage reservoir 111 in the direction perpendicular to the gas distribution pipes 112, and subsequently bends and extends in a direction parallel to the gas distribution pipes 112 to a suitable position.

Figure 6:
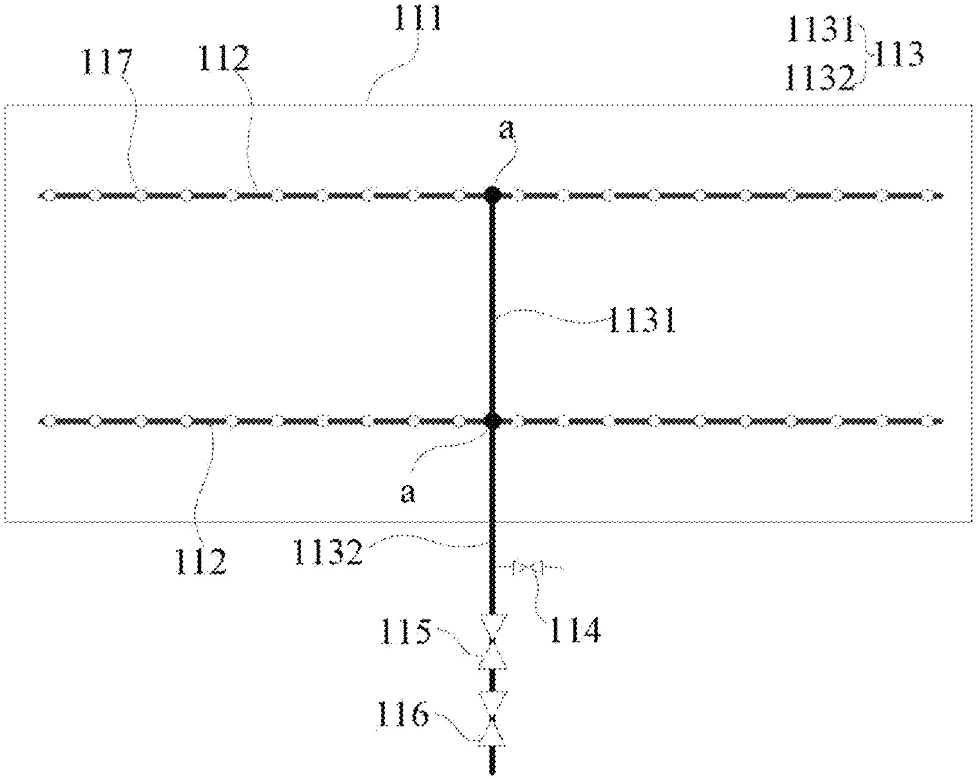
FIG. 6 illustrates a third schematic structural diagram of the gas storage reservoir assembly according to an embodiment of the disclosure.

For example, in the gas storage reservoir assembly 110 illustrated in FIG. 6, the second connecting pipe 1132 can extend outside the boundary of the gas storage reservoir 111 in the direction parallel to the first connecting pipe 1131. For instance, the extension direction of each gas distribution pipe 112 is parallel to the length of the gas storage reservoir 111. The first connecting pipe 1131 extends in the direction perpendicular to the gas distribution pipes 112 and connects to the gas distribution pipes 112. The first end of the second connecting pipe 1132 is connected to the end of the first connecting pipe 1131, and then extends outside the boundary of the gas storage reservoir 111 in the direction perpendicular to the direction of each gas distribution pipe 112. This exemplary configuration allows the second connecting pipe 1132 to have a shorter length, thereby significantly reducing the cost of the gas storage reservoir assembly 110. Moreover, by connecting the end of the second connecting pipe 1132 to the end of the first connecting pipe 1131, rather than to the middle of the first connecting pipe 1131, the number of connection positions can be reduced, which further helps to lower costs.

In the gas storage reservoir assembly 110 illustrated in FIGS. 4-6, the connecting pipe 113 is exemplarily described with two gas distribution pipes 112 provided in the gas storage reservoir assembly 110. It can be understood that in the embodiments of the disclosure, the number of the gas distribution pipes 112 in the gas storage reservoir assembly 110 is not limited to two. For example, in the gas storage reservoir assembly 110 illustrated in FIG. 8, only one gas distribution pipe 112 may be provided. In this embodiment, the connecting pipe 113 can be directly connected to the gas distribution pipe 112 and extend outside the boundary of the gas storage reservoir 111. As another embodiment, the gas storage reservoir assembly 110 illustrated in FIG. 9 includes three gas distribution pipes 112, and the connecting pipe 113 can be connected to all of the three gas distribution pipes 112 and extend outside the boundary of the gas storage reservoir 111.

Figure 7:
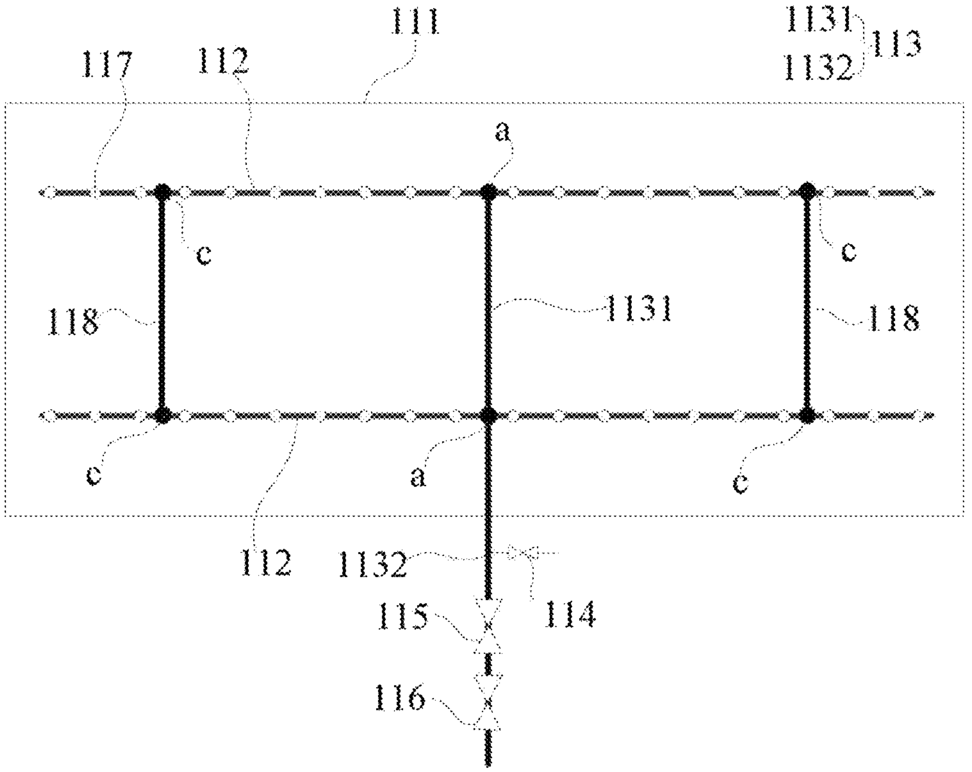
FIG. 7 illustrates a fourth schematic structural diagram of the gas storage reservoir assembly according to an embodiment of the disclosure.
Figure 8:
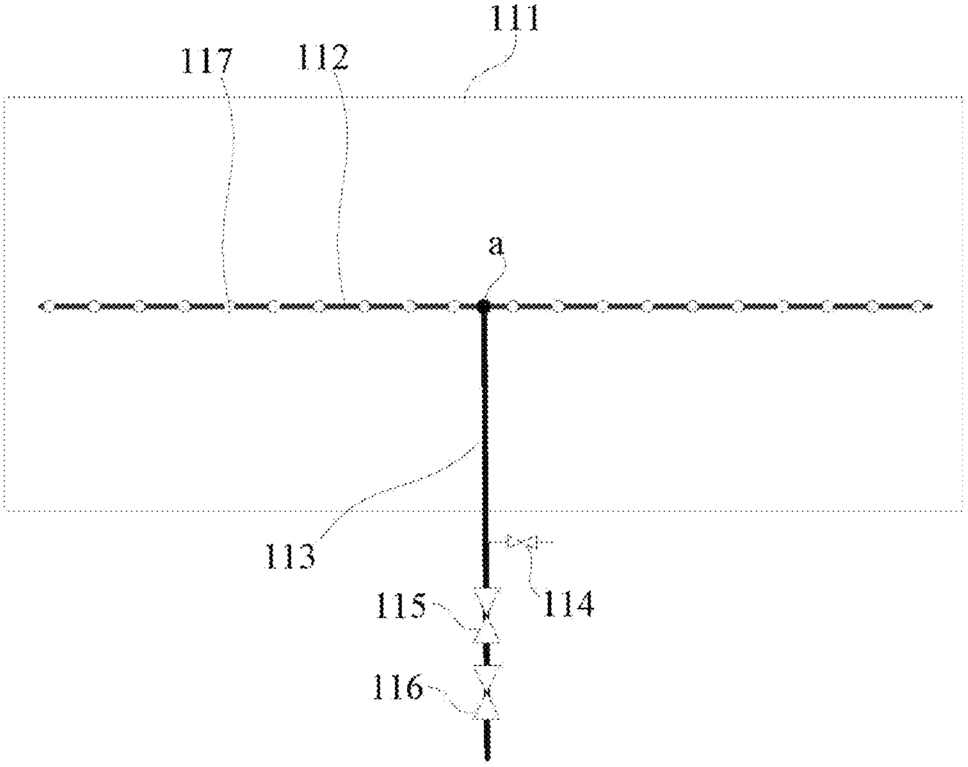
FIG. 8 illustrates a fifth schematic structural diagram of the gas storage reservoir assembly according to an embodiment of the disclosure.

In an embodiment of the disclosure, as shown in FIG. 7, the number of the gas distribution pipes 112 is multiple. The gas storage reservoir assembly 110 further includes balance pipes 118, and each balance pipe 118 is connected to the gas distribution pipes 112 (as illustrated in FIG. 7, position c indicates a connection position of the gas distribution pipe 112 and each balance pipe 118). In other words, the gas distribution pipes 112 are interconnected not only through the connecting pipe 113 but also through the balance pipes 118. Thus, within the boundary of the gas storage reservoir 111, gas paths between the gas distribution pipes 112 form a grid-like structure through the balance pipes 118 and the connecting pipe 113, which facilitates the balance of gas resistance between different gas distribution pipes 112, thereby promoting the uniformity of gas intake flow or gas exhaust flow in the different regions of the gas storage space 111*a* of the gas storage reservoir 111.

Specifically, the balance pipes 118 are provided in pairs, and each pair of the balance pipes 118 is disposed on opposite sides of the first connecting pipe 1131 and at equal intervals from the first connecting pipe 1131. For example, in the embodiment of FIG. 7, the gas storage reservoir assembly 110 is provided with a pair of balance pipes 118. Furthermore, an extension direction of each balance pipe 118 is perpendicular to the extension direction of each gas distribution pipe 112.

In an embodiment of the disclosure, as shown in FIGS. 4-12, the connecting pipe 13 is provided with a shut-off valve 116. In this embodiment, the shut-off valve 116 can be opened or closed. When the shut-off valve 116 is opened, the gas distribution pipe 112 can be connected to the pipeline structure 120, the energy storage assembly 200, or the energy release assembly 400 through the connecting pipe 113, thereby allowing the gas storage reservoir assembly 110 to intake or exhaust the gaseous carbon dioxide. When the shut-off valve 116 is closed, the connecting pipe 113 can be shut off, thereby disconnecting the gas storage space 111*a* of the gas storage reservoir 111 from the pipeline structure 120, the energy storage assembly 200, and the energy release assembly 400. Particularly, when the gas storage reservoir assembly 110 requires maintenance, the shut-off valve 116 can be closed to isolate the gas storage reservoir assembly 110 from the carbon dioxide energy storage system SYS, preventing interruption of the operation of the carbon dioxide energy storage system SYS during maintenance of the gas storage reservoir assembly 110. Specifically, the shut-off valve 116 can be disposed outside the boundary of the gas storage reservoir 111 to facilitate control and maintenance of the shut-off valve 116, thereby further improving maintainability of the gas storage reservoir assembly 110.

In an embodiment of the disclosure, as shown in FIGS. 4-12, the connecting pipe 113 is further provided with an exhaust mechanism 114, and the exhaust mechanism 114 may be disposed between the shut-off valve 116 and the first end of the connected pipe 113. That is, in a gas flow path, the exhaust mechanism 114 is located between the shut-off valve 116 and the gas distribution pipe 112. The exhaust mechanism 114 may be disposed outside the boundary of the gas storage reservoir 111. When the exhaust mechanism 114 is opened, the connecting pipe 113 can be directly connected to an external environment, such as an external air space. At this time, when the gas storage space 111*a* of the gas storage reservoir 111 contains gaseous carbon dioxide, the gaseous carbon dioxide can be discharged through the exhaust mechanism 114. As an application method, when the gas storage reservoir assembly 110 requires maintenance, the shut-off valve 116 can be closed to isolate the gas storage reservoir assembly 110 from the gas flow path of the carbon dioxide energy storage system SYS, and the exhaust mechanism 114 can be opened to discharge the gaseous carbon dioxide from the gas storage space 111*a* of the gas storage reservoir 111 or to replace gas within the gas storage space 111*a* of the gas storage reservoir 111. Specifically, in a normal operating mode of the gas storage reservoir assembly 110, the exhaust mechanism 114 can remain closed.

In an embodiment of the disclosure, as shown in FIGS. 4-12, the connecting pipe 13 may further provided with a flow control mechanism 115. The flow control mechanism 115 is configured to control a flow rate of gaseous carbon dioxide flowing through the connecting pipe 113. Particularly, when the carbon dioxide energy storage system SYS includes the multiple gas storage reservoir assemblies 110, the flow control mechanisms 115 of the gas storage reservoir assemblies 110 can be adjusted to regulate gas intake flow rates or gas exhaust flow rates of the gas storage reservoir assemblies 110, t such that the gas intake flow rates or the gas exhaust flow rates of the gas storage reservoir assemblies 110 are substantially consistent. Specifically, the flow control mechanism 115 may be located outside the boundary of the gas storage reservoir 111 to facilitate control and maintenance of the flow control mechanism 115.

In an embodiment, the flow control mechanism 115 can be a flow control valve, such as a louver valve.

In other embodiments, the flow control mechanism 115 may include multiple branch pipes arranged in parallel, and each of the branch pipes is provided with a valve. The connecting pipe 113 is divided into two segments at the flow control mechanism 115, and the two segments are interconnected through the branch pipes. Specifically, a sum of cross-sectional areas of the branch pipes is not less than a cross-sectional area of the connecting pipe 113. Thus, when the valve on a branch pipe is closed, the branch pipe is shut off; when the valve on the branch pipe is open, the branch pipe is open. A flow rate of gaseous carbon dioxide flowing through the connecting pipe 113 can be controlled by regulating a number of open branch pipes. Specifically, a diameter of each of the branch pipes is 0.4 to 0.5 times a diameter of the connecting pipe 113, and the sum of the cross-sectional areas of the branch pipes is 1.2 to 1.5 times the cross-sectional area of the connecting pipe 113.

As illustrated in FIG. 4 through FIG. 12, the flow control mechanism 115 is disposed between the shut-off valve 116 and the gas exhaust mechanism 114. It should be understood that in other embodiments of the disclosure, the flow control mechanism 115 may alternatively be disposed at other positions. For example, the flow control mechanism 115 may be disposed on a side of the gas exhaust mechanism 114 facing away from the shut-off valve 116, or on a side of the shut-off valve 116 facing away from the gas exhaust mechanism 114.

In an embodiment of the disclosure, the carbon dioxide energy storage system SYS includes multiple gas storage reservoir assemblies 110, and the multiple gas storage reservoir assemblies 110 are all connected to the pipeline structure 120. Both the energy storage assembly 200 and the energy release assembly 400 are connected to the pipeline structure 120. The pipeline structure 120 can be in the form of a ring network, a topological network, or a main trunk pipeline. In an exemplary embodiment, the pipeline structure 120 includes interfaces corresponding one-to-one with the gas storage reservoir assemblies 110, and a second end of each of the gas storage reservoir assemblies 110 is connected to a corresponding one of the interfaces. Specifically, no valve mechanism is disposed between any two adjacent interfaces. Thus, every two adjacent gas storage reservoir assemblies 110 can be interconnected through the pipeline structure 120. When charging or discharging gas to or from the gas storage reservoir assemblies 110, the adjacent gas storage reservoir assemblies 110 can achieve rebalancing of gas intake flow or gas exhaust flow through the pipeline structure 120, thereby facilitating synchronous gas intake or synchronous gas discharge among the gas storage reservoir assemblies 110.

After considering the specification and practicing the disclosure disclosed herein, those skilled in the art will readily think of other embodiments of the disclosure. The disclosure aims to cover any variants, uses, or adaptive changes of the disclosure. These variants, uses, or adaptive changes follow general principles of the disclosure and include common knowledge or conventional techniques in this technical field not disclosed herein. The specification and the embodiments are merely illustrative. The true scope and spirit of the disclosure are defined by the appended claims.

What is claimed is:

1. A gas storage reservoir assembly, applied to a carbon dioxide energy storage system, wherein the carbon dioxide energy storage system comprises an energy storage assembly, an energy storage container, and an energy release assembly sequentially connected in that order;

wherein the gas storage reservoir assembly comprises a gas storage reservoir, gas distribution pipes, and a connecting pipe;

wherein each of the gas distribution pipes is provided with a plurality of gas ports connected to a gas storage space of the gas storage reservoir; and a first end of the connecting pipe is connected to the gas distribution pipes, and a second end of the connecting pipe is connected to at least one of the energy storage assembly and the energy release assembly directly or through a pipeline structure;

wherein a distance between a connection position a of each of the gas distribution pipes and the connecting pipe, and an end of the gas distribution pipe is 40% to 60% of a length of the gas distribution pipe;

wherein in at least two adjacent gas ports of the plurality of gas ports on each of the gas distribution pipes, an opening size of one of the at least two adjacent gas ports close to the connection position a is smaller than an opening size of another one of the at least two adjacent gas ports facing away from the connection position a; or along a direction from the connection position a of each of the gas distribution pipes to the end of the gas distribution pipe, a spacing between the plurality of gas ports gradually decreases, such that gas intake flow rates or gas exhaust flow rates of the gas ports are consistent, thereby maintaining a balanced total gas inflow or outflow in different regions of the gas storage space of the gas storage reservoir;

wherein a number of the gas distribution pipes in the gas storage reservoir assembly is multiple, and the gas distribution pipes are arranged parallel to each other and arranged at equal intervals; the gas storage reservoir has a characteristic edge parallel to the gas distribution pipes; and when the gas storage space of the gas storage reservoir is filled with gaseous carbon dioxide, a height of the gas storage space close to each edge of the gas storage reservoir is less than a height of the gas storage space close to a middle portion of the gas storage reservoir; and wherein a distance between every two adjacent gas distribution pipes of the gas distribution pipes on a horizontal plane is X, and a component of a distance between the characteristic edge of the gas storage reservoir and one of the gas distribution pipes closest to the characteristic edge on a horizontal plane is Y, where $X/2<Y<X$.

2. The gas storage reservoir assembly as claimed in claim 1, wherein an extension direction of each of the gas distribution pipes is parallel to a length direction of the gas storage reservoir to reduce a number of connection positions between the gas distribution pipes and the connecting pipe.

3. The gas storage reservoir assembly as claimed in claim 2, wherein the number of the gas distribution pipes is multiple; and a long edge of the gas storage reservoir, the gas distribution pipes, and another long edge of the gas storage reservoir are sequentially arranged side by side at equal intervals in that order.

4. A carbon dioxide energy storage system, comprising the gas storage reservoir assembly as claimed in claim 3.

5. A carbon dioxide energy storage system, comprising the gas storage reservoir assembly as claimed in claim 2.

6. The gas storage reservoir assembly as claimed in claim 1, wherein in each of the gas distribution pipes, the at least two adjacent gas ports of the plurality of gas ports have different opening sizes to regulate gas intake flow or gas exhaust flow of the at least two adjacent gas ports.

7. A carbon dioxide energy storage system, comprising the gas storage reservoir assembly as claimed in claim 6.

8. The gas storage reservoir assembly as claimed in claim 1, wherein the number of the gas distribution pipes is multiple; and wherein the connecting pipe comprises a first connecting pipe and a second connecting pipe; the first connecting pipe is connected to the gas distribution pipes; and an end of the second connecting pipe is connected to the first connecting pipe, and another end of the second connecting pipe extends outside a boundary of the gas storage reservoir.

9. The gas storage reservoir assembly as claimed in claim 8, wherein an extension direction of the first connecting pipe is perpendicular to the extension direction of each of the gas distribution pipes; and wherein the end of the second connecting pipe is connected to an end of the first connecting pipe, and an extension direction of the second connecting pipe is parallel to the extension direction of the first connecting pipe; or a distance between a connection position b of the first connecting pipe and the second connecting pipe, and an end of the first connecting pipe is 40% to 60% of a length of the first connecting pipe, and the extension direction of the second connecting pipe is perpendicular to the extension direction of the first connecting pipe.

10. A carbon dioxide energy storage system, comprising the gas storage reservoir assembly as claimed in claim 9.

11. A carbon dioxide energy storage system, comprising the gas storage reservoir assembly as claimed in claim 8.

12. The gas storage reservoir assembly as claimed in claim 1, wherein the gas distribution pipes and the connecting pipe are buried below a base membrane of the gas storage reservoir, each of the plurality of gas ports is a vertical pipe, a lower end of each of the plurality of gas ports is connected to a corresponding one of the gas distribution pipes, and an upper end of each of the plurality of gas ports penetrates through the base membrane of the gas storage reservoir and extends into the gas storage space.

13. A carbon dioxide energy storage system, comprising the gas storage reservoir assembly as claimed in claim 12.

14. The gas storage reservoir assembly as claimed in claim 1, wherein the number of the gas distribution pipes is multiple; and the gas storage reservoir assembly further comprises a pair of balance pipes, an extension direction of each of the pair of balance pipes is perpendicular to that of each of the gas distribution pipe, the extension direction of each of the pair of balance pipes is parallel to that of the connecting pipe, each of the pair of balance pipes is connected to each of the gas distribution pipes, the pair of balance pipes are disposed on opposite sides of the connecting pipe and at equal intervals from the connecting pipe.

15. A carbon dioxide energy storage system, comprising the gas storage reservoir assembly as claimed in claim 14.

16. The gas storage reservoir assembly as claimed in claim 1, wherein the connecting pipe is provided with a shut-off valve, a flow control mechanism, and an exhaust mechanism disposed between the shut-off valve and the first end of the connecting pipe; and wherein the shut-off valve is configured to control closing or opening of the gas storage reservoir assembly, the flow control mechanism is configured to control gas intake flow or gas exhaust flow of the gas storage reservoir assembly, and the exhaust mechanism is configured to control exhaust or closure of the gas storage reservoir assembly.

17. A carbon dioxide energy storage system, comprising the gas storage reservoir assembly as claimed in claim 16.

18. A carbon dioxide energy storage system, comprising the gas storage reservoir assembly as claimed in claim 1.

* * * * *